Sheet 1. 2 Sheets
MILLINGTON and GEORGE'S
DIVIDING ENGINE for GRADUATING SQUARES
4523 REISSUED AUG 22 1871
No. 1.
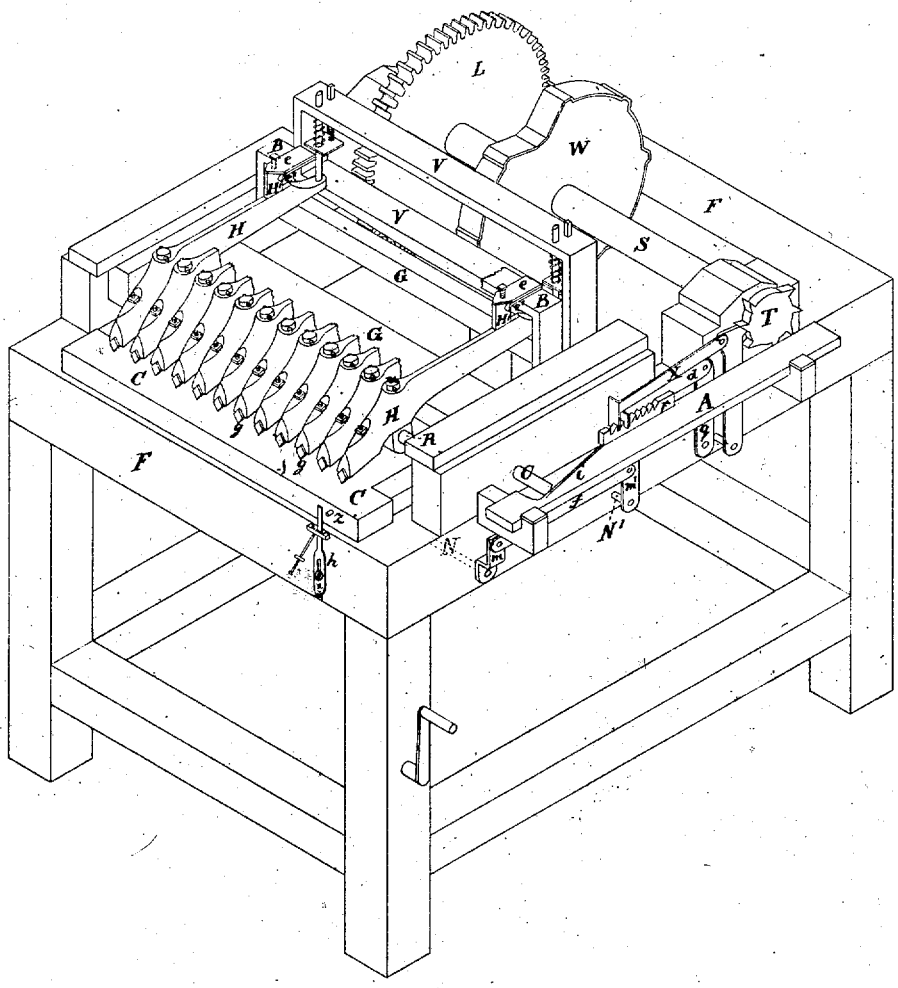
Witnesses:
A. Hoerman
C. C. Livingston
Inventor:
The Eagle Square Co
by their attys
T. S. Stetson Sheet. 2. 2 Sheets
4523
No. 2.
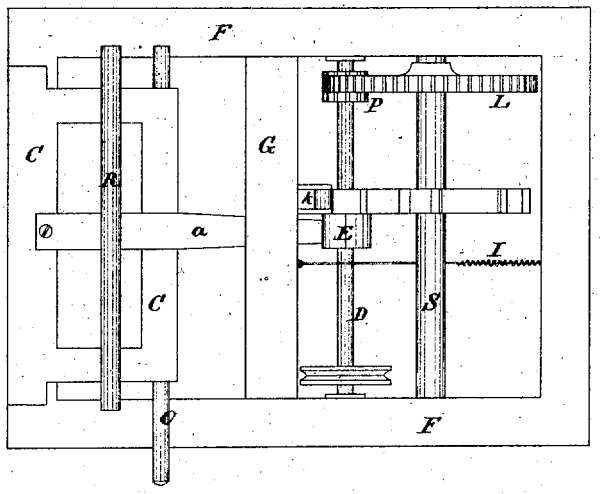
No. 3.
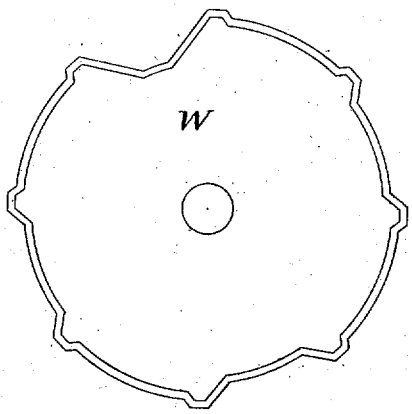
No. 4.
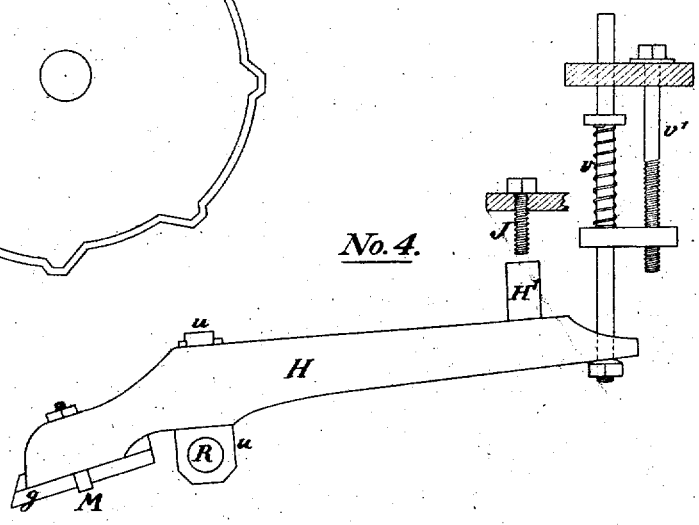
No. 5.
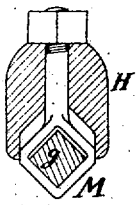
No. 6.
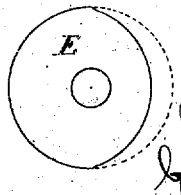
Witnesses:
A. Hoerman
C. C. Livingst
Inventor:
The Eagle Square Co
by their atty. [illegible]

UNITED STATES PATENT OFFICE.

NORMAN MILLINGTON, OF SHAFTSBURY, VERMONT, ASSIGNOR TO THE EAGLE SQUARE COMPANY.

IMPROVEMENT IN MACHINES FOR GRADUATING SQUARES AND RULES.

Specification forming part of Letters Patent No. 11,489, dated August 8, 1854; extended seven years; reissue No. 4,523; dated August 22, 1871.

*To all whom it may concern:*

Be it known that NORMAN MILLINGTON and DENNIS J. GEORGE, of Shaftsbury, in the county of Bennington and State of Vermont, did in-invent a new and Improved Machine for Graduating Carpenters' Squares, Rules, &c.; and to enable others skilled in the art to make and use the said invention we will proceed to give a particular description of what we consider the best construction and operation.

If designed for the common carpenter's square, two feet long, twenty-four gravers are provided, about four inches long, firmly set in metallic handles or stocks about twenty inches long and attached to a rod about one-fourth the distance from the front end of the handles, the rear ends being adjusted by screws and springs. These handles are placed side by side, one inch apart, from center to center, and are attached to a carriage about one foot wide and two feet long, which slides longitudinally, sufficiently to make the longest cross-mark, on ways, and is pressed forward to cut the marks by a wheel in the rear, having on its periphery a succession of eight cams, (to divide the inch into eighths,) the highest point of each rising to the same plane, but differing in depth, to give the desired length of mark to each of the several divisions of the inch. The square to be graduated is confined to the front rail of a carriage directly under the points of the gravers, and is moved, at right angles to the motion of the gravers, by an inclined plane, and the motions of the two carriages are so arranged that as often as the square is pressed forward one-eighth by the inclined plane each of the gravers cuts at the proper place the desired cross-marks for the inches, halves, quarters, and eighths, and, as there are twenty-four gravers, each graduating one inch, the whole square is completed while the square moves laterally but a single inch.

The accompanying drawing, which makes a part of this specification and to which reference is made, is as follows, viz.: Figure 1 is an isometrical delineation of the machine. Fig. 2 is a plan view of the machine with the gravers and their carriage removed. The remaining figures are drawn on a larger scale. Fig. 3 is the cam-wheel, with eight cams to divide the inch into eighths. Fig. 4 is a graver and handle enlarged, showing also the universal joint. Fig. 5 is a cross-section through a graver and stock; it shows, in double the size of that in Fig. 4, how a single bolt confines the graver by pressing against two faces. Fig. 6 is the single elliptical cam on the driver-shaft.

The same letter wherever found refers to the same article.

F is the cast-iron frame or bed-piece to which all the parts are attached. C is the carriage on which the square is confined for graduating. G is the graver-carriage, to which the gravers are attached. It slides longitudinally forward and backward on ways, being drawn back by the spring I into the spaces between the cams, to begin each mark at the proper distance from the edge for each division of the inch. It is pressed forward by the cams, which all rise to the same plane, so as to bring the points of the gravers across to the front edge of the square. I is a spiral spring connected to the rear edge of the graver-carriage G and back side of the bed-piece F, to draw back the graver *g* from the edge of square. R is a rod on the front side of the graver-carriage G, to which the graver-handles or stocks H are attached by the universal joint *u*. V is a balance-frame, turning at its center on the rear rail of the graver-carriage G, so that the gravers will cut the same depth on the thin as on the thick end of the taper square. There are screws *v'* and springs *v* standing perpendicularly in the balance-frame V to adjust the pressure on the rear end of the graver-handles. There are guides *e e'* attached to the cross-bar B in front of the balance-frame V, the lowermost *e'* of each having a slot or score at the front end to receive the short vertical arm H' on the corresponding handle H, and the uppermost *e* having a screw, J, by which the corresponding graver is controlled so as to prevent its ever cutting the carriage C in any contingency. B is a cross-bar in front of the balance-frame V, represented in the drawing as partially broken away. H are graver-handles (see Fig. 4) turning on the rod R and adjustable at the rear end by the guides *e e'* and spiral springs *v* and screws *v'*. The gravers *g* are small square rods, about four inches long, placed cornerwise under and projecting a little beyond the front of the handles H, to which they are firmly attached by loop-bolts M, the rear end being raised at an angle of twenty-four degrees from the bed-piece. The gravers *g*, by lying in triangular V-shaped grooves or recesses in the under faces of the several handles H, are held therein by single loop-bolts M, which press them against both faces of the V-shaped grooves, so that they can hold them fast by both faces with a single bolt. The universal joint (see Fig. 4) connects the graver-handle H to the rod R, so that it can be turned or adjusted slightly in all directions, either on the rock-shaft by the action of the screws *v* and springs *v'* or swiveled around horizontally. W is a cam-wheel on the cam-shaft. On the periphery of the cam-wheel W is a series of cams, offsets, or recesses, the cams all rising (see Fig. 3) to the same plane, but the recesses being of different depths, to make the mark of the proper length to each division of the inch, it being situated in rear of the graver-carriage G to press forward the carriage and gravers to the front edge of the square. S is the cam-shaft, to which the large gear-wheel L, cam-wheel W, and tappet-wheel T are fixed. L is the large gear on the cam-shaft S, making one revolution to eight of the driver-shaft D. E is a semi-round and semi-elliptical cam on the driver-shaft D, (see Fig. 6,) to raise and sustain the square on the front of the carriage C, by means of the arm *a*, while the marks are being cut, and to allow it to sink out of the way while the gravers are withdrawn. P is a small pinion on the driver-shaft D, so geared as to make eight revolutions while the cam-shaft S makes but one. The arm *a*, attached to the carriage C and extending under the elliptical cam E, is operated by the latter to raise the square to the points of the gravers to receive the marks. T is a tappet-wheel on the end of the cam-shaft S, on the periphery of which are as many tappets or projections (save one) as there are to be equal parts or divisions in each inch. These tappets, acting on the rear end of the pawl X, move forward the ratchet *r* and the slide A, carrying the inclined plane *i*. X is a pawl, hung in the rear near the tappet-wheel T, by which it is moved forward, the front end resting on the detent *d* and ratchet *r*. A detent, *d*, is hung to the arm *q* under the pawl X and rests in the ratchet *r*, a little in rear of the pawl X, to detain the ratchet when the pawl is lifted and while the gravers are cutting. A is a slide moving longitudinally on the outside of the bed-piece F, on the inner edge of which the inclined plane *i* and the ratchet *r* are attached. It is moved forward by the pawl X and brought back to its starting point by a spring, not represented. The ratchet *r* is carried on the inner edge of the slide A, and forms a part of the same. The inclined plane *i* on the inner edge of the slide A is pressed against the end of the rock-shaft O, and moves the carriage C and the square, not represented, which is fixed thereon laterally, so as to measure the successive divisions of the inch. O is a long rock-shaft supporting the back side of the carriage C, and on which the carriage rocks to raise the square up to the points of the gravers. It slides laterally, by the action of the inclined plane *i*, at every successive division of the inch. N is a short rock-shaft projecting from under the bed-piece F, and having two arms. One, *m*, is on the outside of the bed-piece. The other, not represented, is on the inside of the bed-piece, and stands nearly at right angles with the outer arm *m*. By the agency of this outer arm *m* and its its connections the pawl X and detents *d* are raised from the ratchet *r* at the proper time, and the slide A is then drawn back by a spring, not represented. This lifting of the pawl and detent is effected by an arm, *m'*, on the outside of the short rock-shaft N, the top being cut to an angle of some forty-five degrees to slide under a lifting-pin, not shown, in the back side of the detent, and raise both the detent *d* and pawl X from the ratchet *r*, and hold them till the slide A with its inclined plane *i* is brought back to its starting point. An adjustable upright slide, *h*, moving up and down on the front of the bed-piece F, extends up to the center of the carriage C, and is raised by the long inside arm of short rock-shaft N, before referred to, and is depressed by the pressure of the pin *z* in the front edge of the carriage C. This pin *z* lodges on and presses down the upright slide *h*. *k* is a friction-roller on the rear rail of the graver-carriage G to reduce the friction of the cam-wheel or movable former W. D is the driver-shaft. The rod *f* connects arms *m* and *m'* of rock-shafts N and N'. It may be remarked that each different style of squares will require a different movable former, W, with different depths of recesses, and these may be placed side by side on the shaft and moved and keyed to act on the friction-roller *k* at pleasure.

The several parts of the machine being arranged as above described, and the square being confined on the front side of the carriage C by clamps or otherwise, and the driver-shaft D being put in motion, the semi-eccentric cam E, by the agency of the arm *a*, presses up the square against the points of the gravers till the springs *v'* at the rear of the graver-handles H bear with sufficient force to mark the square. The deepest recess on the movable former W is that recess which gives the inch-mark. It receives the friction-roller *k* at rear of the carriage G, moving all the gravers and making all the inch-marks on the edge at once. The thinnest or lowest part of the cam E being then revolved to the bottom side, the front of the carriage C falls from the points of the gravers. The tappet-cam T now presses against the rear end of the pawl-lever *p* and operates the pawl X, which, resting on the ratchet *r*, drives forward the slide A with its inclined plane *i*, causing it to press against the end of the rock-shaft O, and thus moves the carriage C, with the square, one-eighth of an inch to one side. The next recess on the wheel or former W is designed to make the first eighth-mark, one of the shortest ones on the square. This mark is produced by the same operation as the inch-mark above described, as are also all the divisions to the inch. When the seventh-mark is made, and the pin *z* has pressed downward the upright slide *h*, then the carriage C rises, to present the square to receive the last marks on the square, and the slide passes under the pin *z*, which, on its next descent, presses down the slide *h*, which, being connected with the arm *m'*, raises the pawl X and detent *d* from the ratchet *r*, and allows both the slide A with its inclined plane *i* and the carriage C to slide back to their starting points, after which the square is removed and another confined to the carriage C. The work is done with accuracy, and in a small fraction of the time required to do it by hand-gravers.

What is claimed, and desired to be secured by Letters Patent, is—

1. The arrangement in a single frame, substantially as set forth, of as many gravers as there are units to be divided, in combination with the wheel or movable former W, so operated as successively to trace, of the proper length, each set of division and fractional lines.

2. The balance-frame V with its appendages to equalize the pressure of the spiral springs on the graver-handle H, so as to give the same depth of mark on the thin as on the thick end of the taper square.

3. The inclined plane *i*, with suitable operating and connecting means, acting wedgewise, as shown, for moving the square longitudinally, and dividing the inch into any desirable number of equal parts.

4. The square-holder C and graver-carriage G, arranged to press the squares and the points of the gravers into contact by a cam or its equivalent, and allow them to separate at the proper time.

5. The slide *h*, worked by the carriage C, operating with the pawl X and detent *d* or their equivalents, and suitable connecting mechanism, as shown, so as to automatically release and return the graduator-piece A *i*, which lays off the spaces to be marked, or repeats the action indefinitely, substantially as specified.

6. The universal joints or swivels *u*, arranged to serve as represented, relatively to the gravers *g* and graver-stocks or handles H, to allow of both vertical and horizontal adjustment, as set forth.

In testimony whereof we have hereunto set our names in presence of two subscribing witnesses.

THE EAGLE SQUARE CO.
A. B. GARDNER, *President.*
NORMAN MILLINGTON.

Witnesses:
G. W. HARMAN,
WM. S. SOUTHWORTH,
O. GREEN,
DANL. ROBERTS.